United States Patent [19]

Backus

[11] 4,189,805
[45] Feb. 26, 1980

[54] ADJUSTABLE HINGE INSTALLATION

[75] Inventor: Harold A. Backus, Wynnewood, Pa.

[73] Assignee: NL Industries, Inc., Hightstown, N.J.

[21] Appl. No.: 935,914

[22] Filed: Aug. 23, 1978

[51] Int. Cl.² .............................................. E05D 7/04
[52] U.S. Cl. ...................................... 16/130; 16/134; 16/137; 16/163
[58] Field of Search ................. 16/134, 133, 132, 130, 16/129, 137, 162, 163, 167

[56] References Cited

U.S. PATENT DOCUMENTS

| 398,636 | 2/1889 | Mallory | 16/129 |
|---|---|---|---|
| 679,377 | 7/1901 | Hibbard | 16/129 |
| 1,221,779 | 4/1917 | Wahlberg | 16/163 |
| 1,484,536 | 2/1924 | Way | 16/131 |
| 1,554,161 | 9/1925 | Hubbard | 16/163 |
| 2,286,509 | 6/1942 | Roby | 16/131 |
| 2,302,484 | 11/1942 | Werner | 16/134 |
| 2,581,104 | 1/1952 | Houlsby | 16/129 |
| 2,583,950 | 1/1952 | Kirschner | 16/129 |
| 2,622,266 | 12/1952 | Stehle | 16/132 |
| 2,683,279 | 7/1954 | Okerlund et al. | 16/129 |
| 2,839,778 | 6/1958 | Hutchinson et al. | 16/129 |
| 2,988,414 | 6/1961 | Crowe et al. | 312/326 |

Primary Examiner—George H. Krizmanich
Attorney, Agent, or Firm—Fitzpatrick, Cella, Harper & Scinto

[57] ABSTRACT

Door hinge arrangements for mounting large heavy doors on openings in irregular structures. The hinge arrangements comprise a pivot rod and an alignment member which extend parallel to each other with the pivot rod bolted to the door and mounted in bearings supported by flanges extending out from the alignment rod. The upper end of the alignment rod is fitted into an opening in a plate extending out from the door support structure so that it can rock or swing a limited amount. The lower end of the alignment rod rests on a horizontal support plate also extending out from the door support structure. A lateral adjustment mechanism is also provided to slide the lower end of the alignment member along the horizontal support plate in any direction to rotate it slightly. A detachable means for holding the hinge members to the door during installation is also disclosed.

24 Claims, 19 Drawing Figures

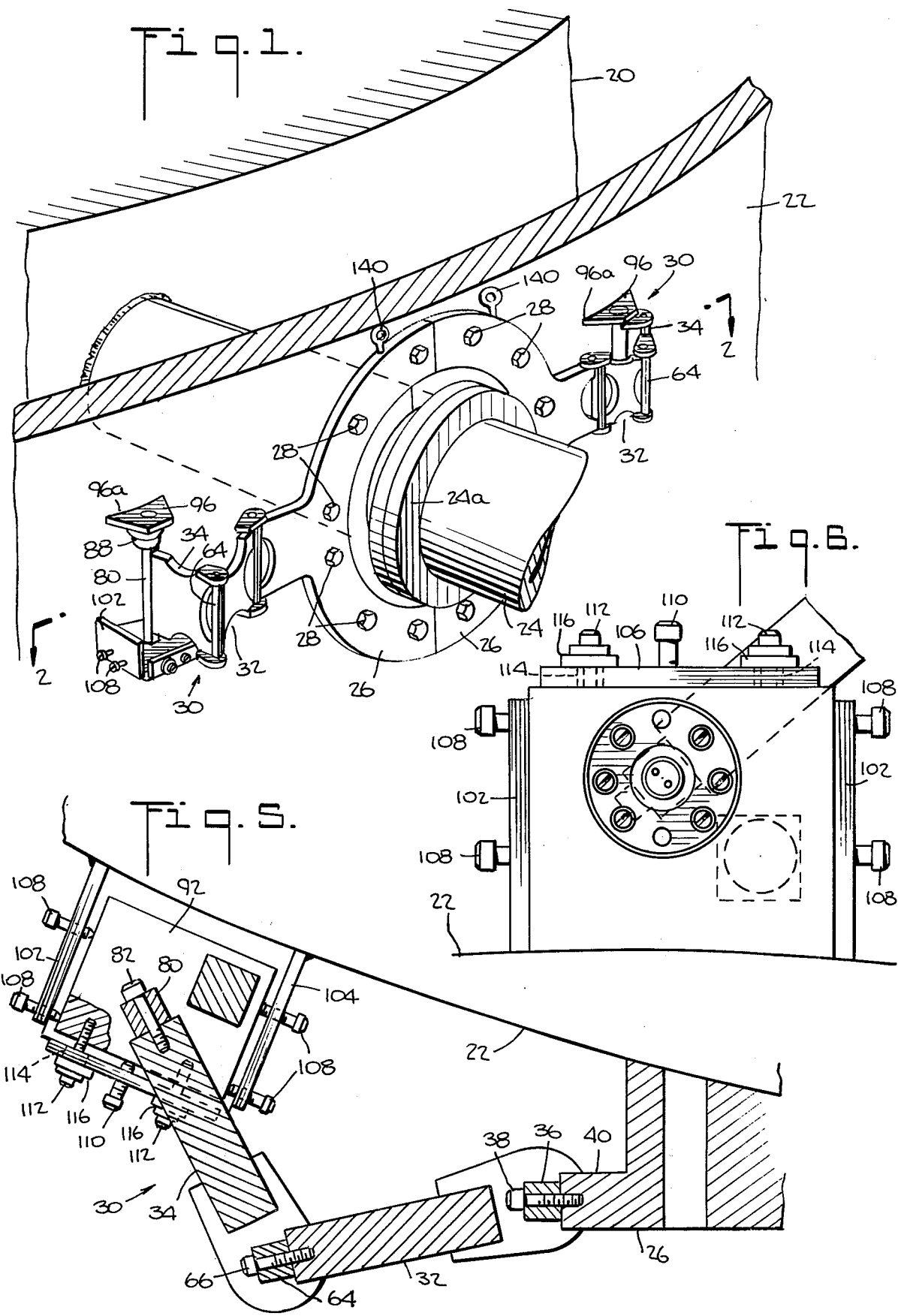

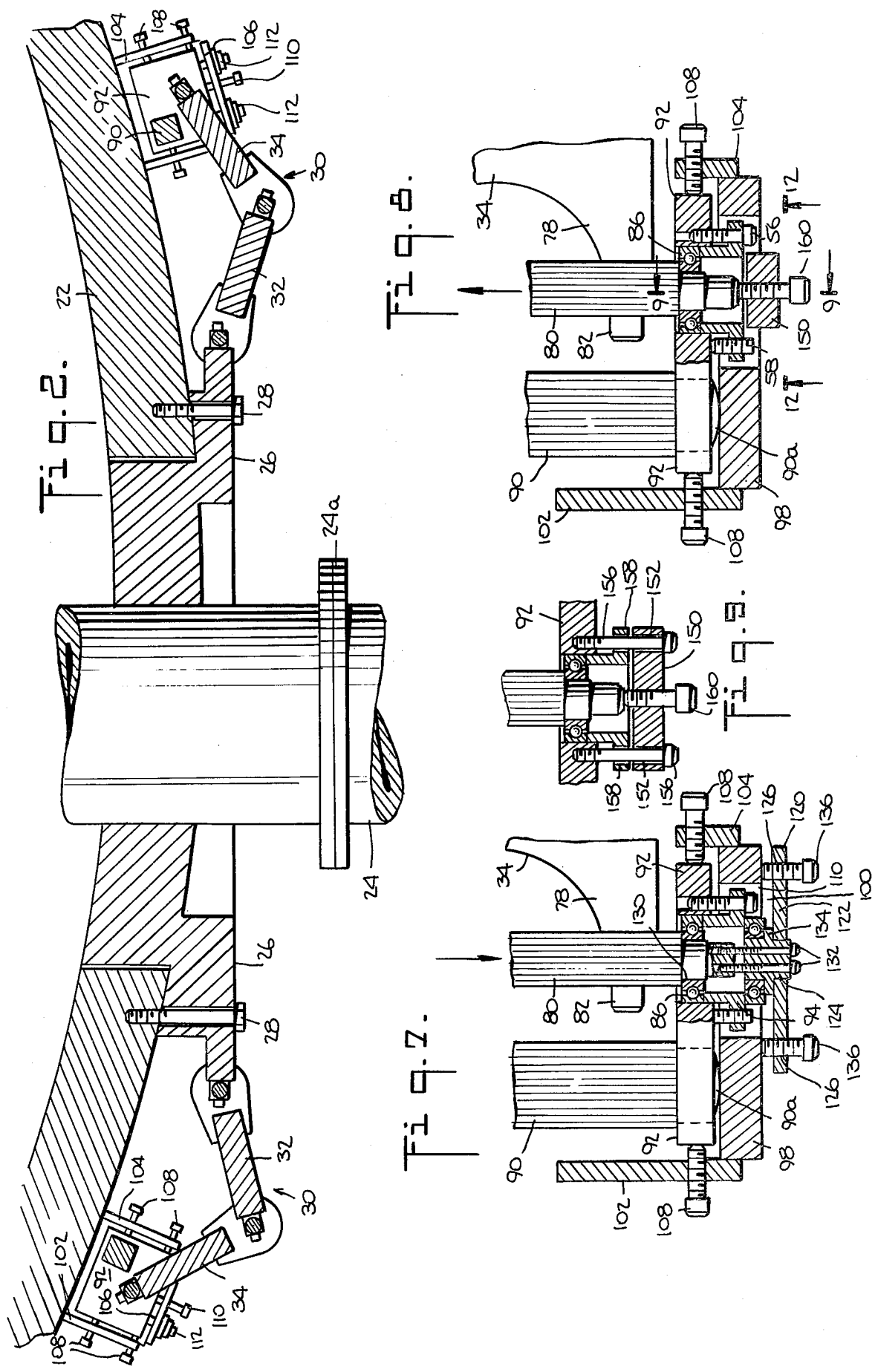

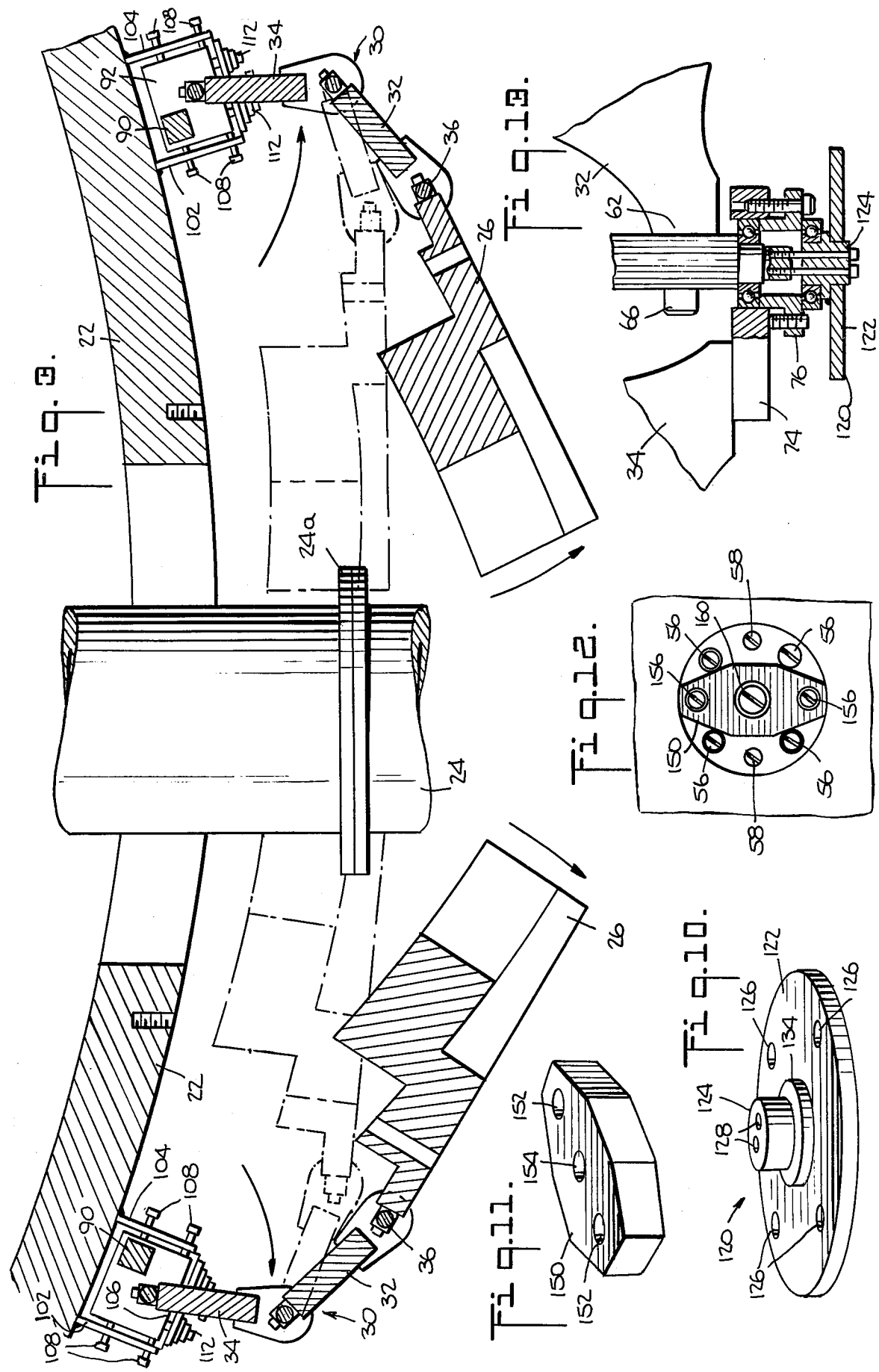

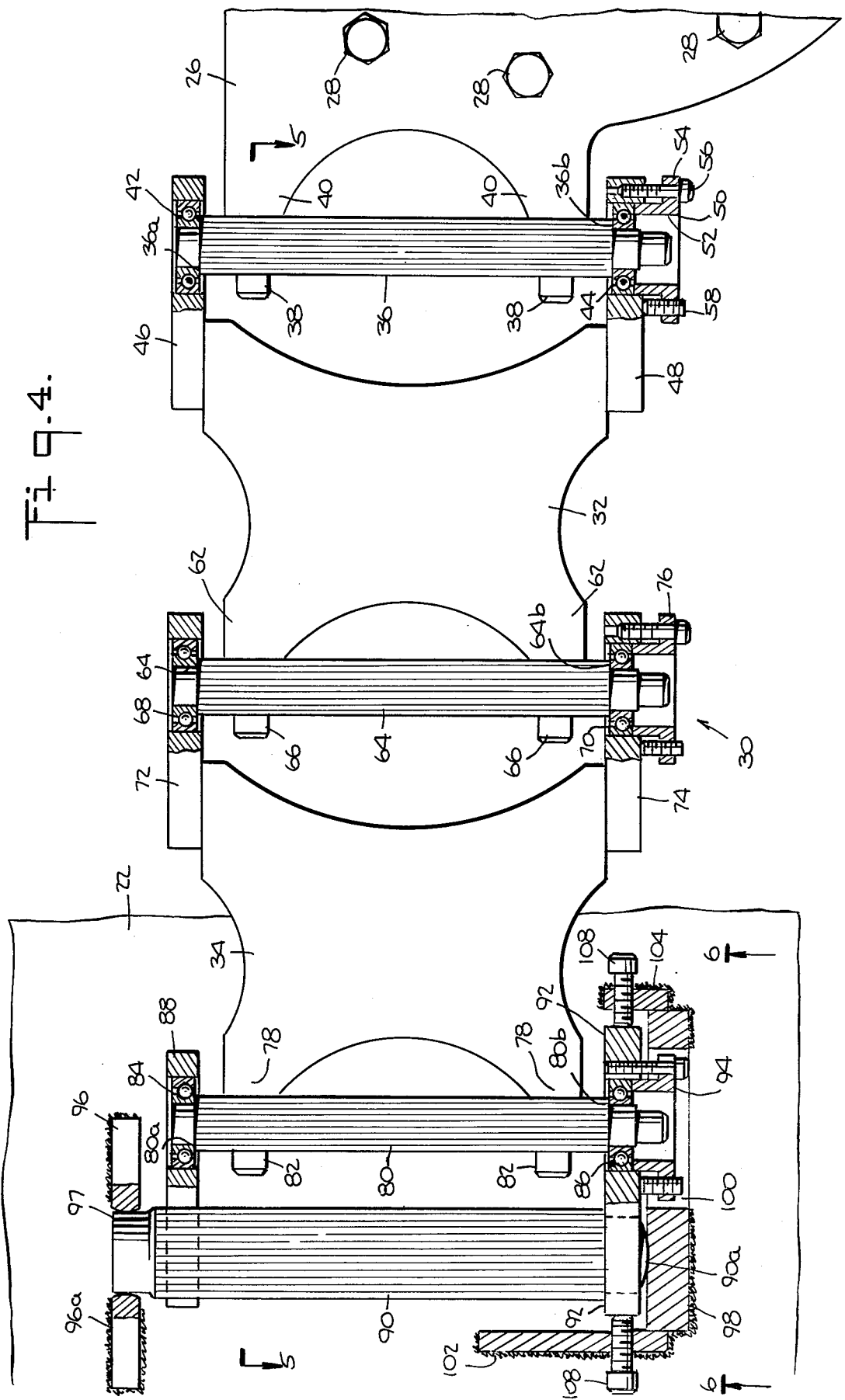

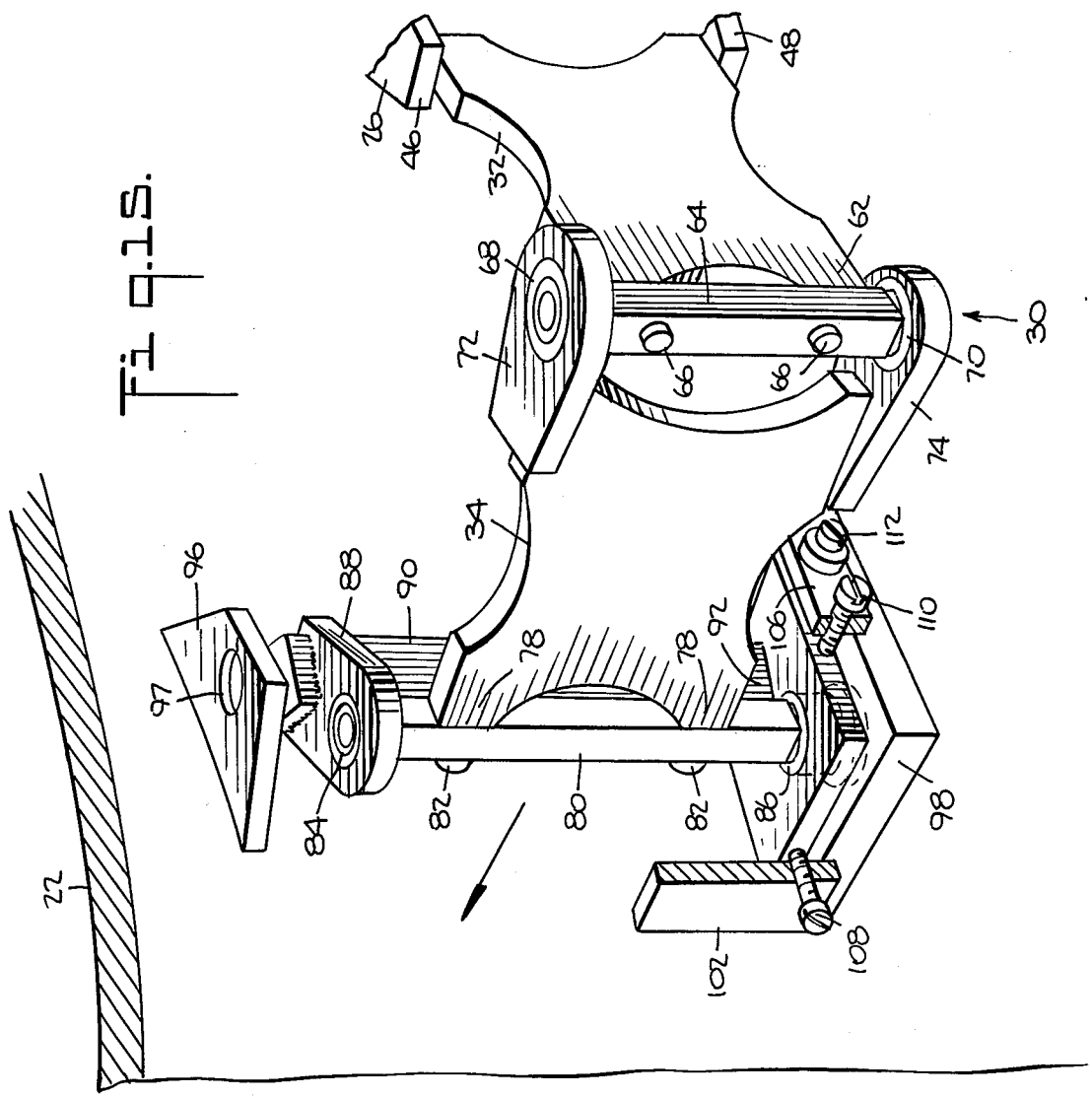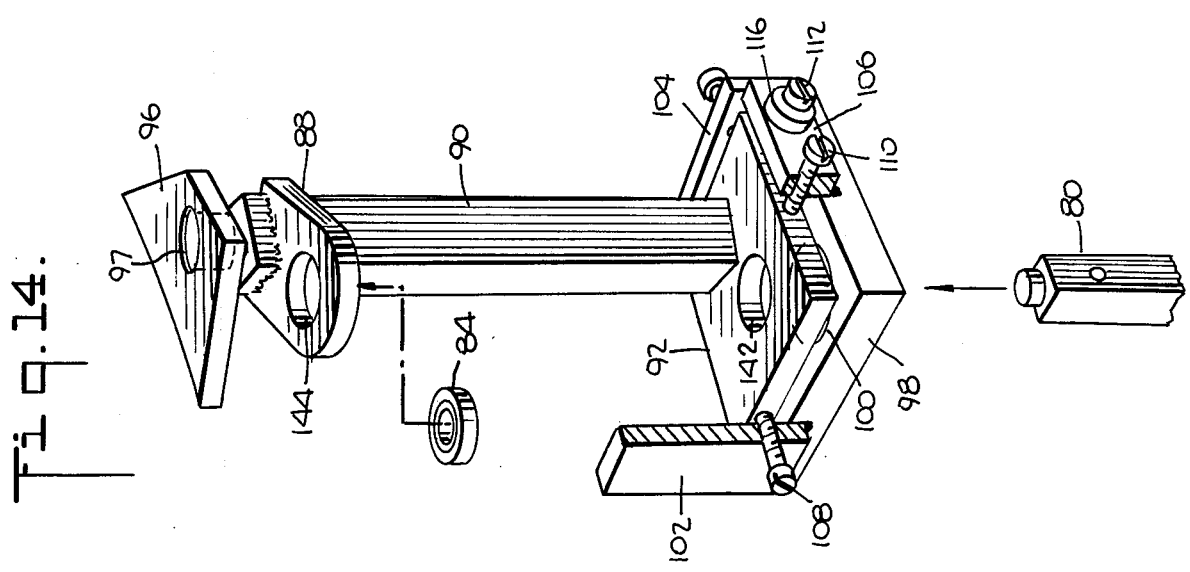

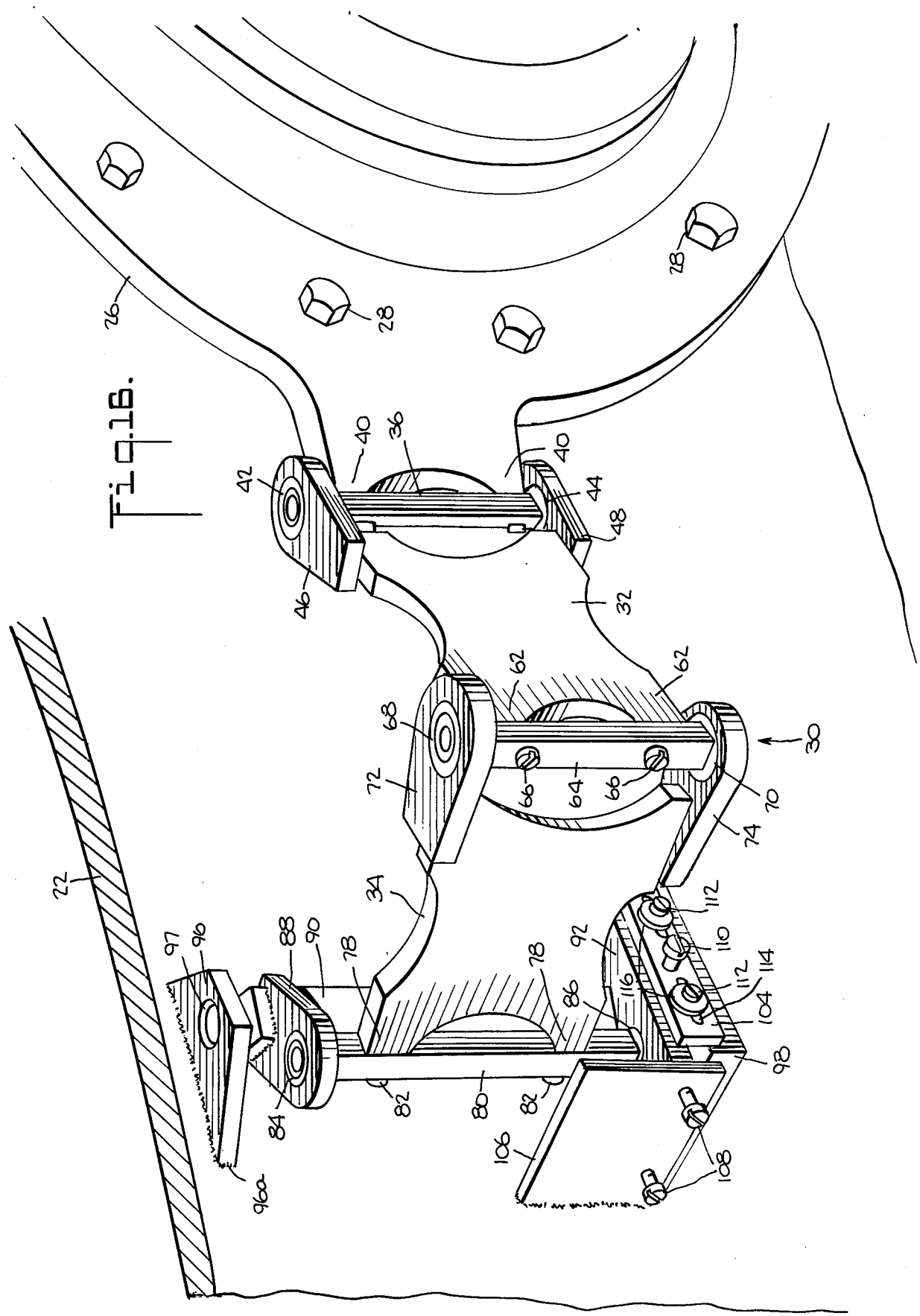

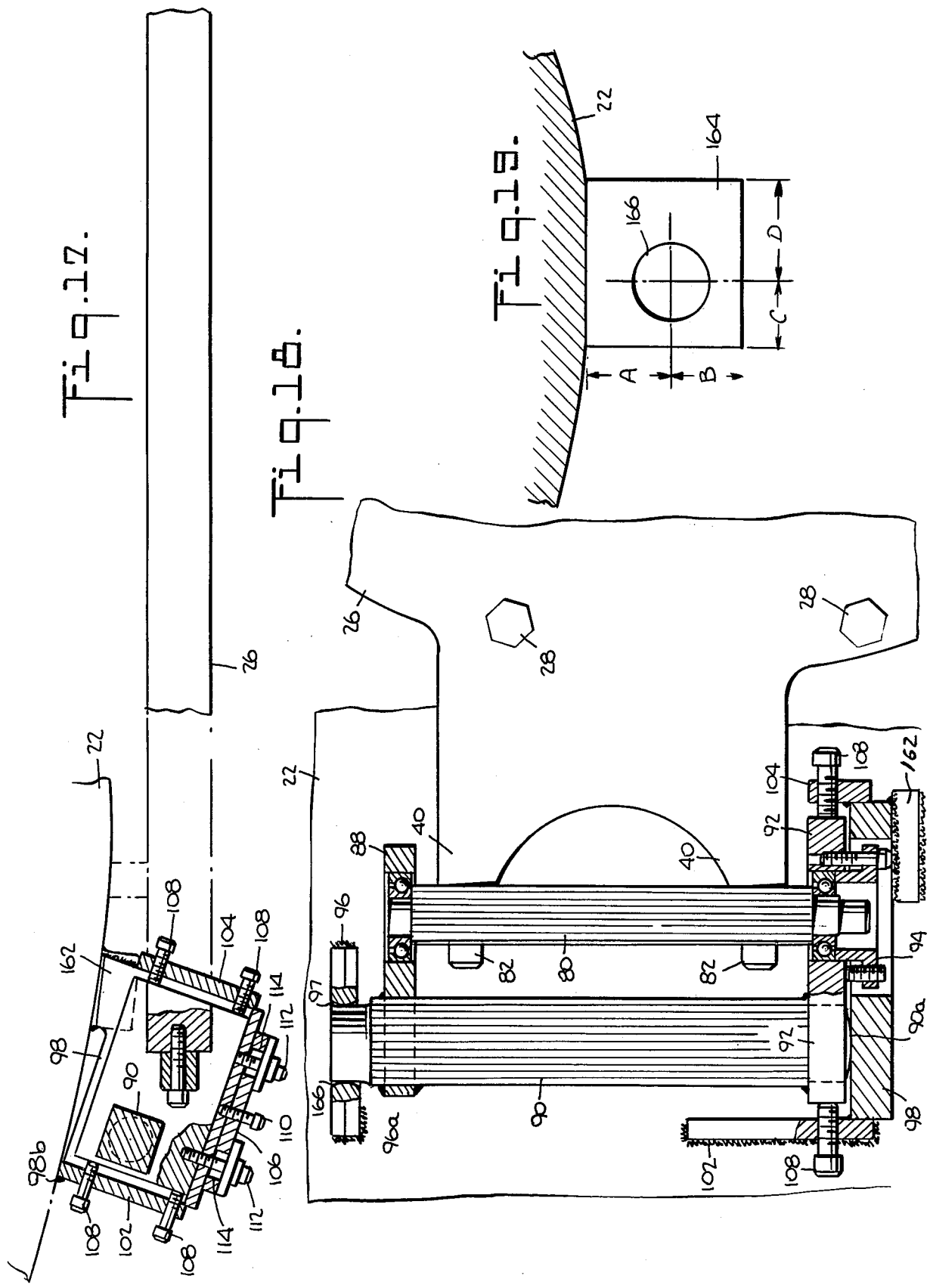

ADJUSTABLE HINGE INSTALLATION

BACKGROUND OF THE INVENTION

1. Field of the Invention

This invention relates to adjustable hinge installations for large heavy doors.

2. Description of the Prior Art

The present invention is particularly suitable for use in supporting large heavy doors on the outer shells of nuclear containment vessels. These outer shells are provided with a plurality of openings through which pipes and other conduits extend from a nuclear reactor contained within the outer shell. In order to provide proper shielding, it is important that the outer shell openings closely enclose the projecting pipes and conduits. On the other hand, ready access must be available to the reactor itself in the region of these openings. Accordingly it has been the practice to provide large openings on the outer reactor shell when each projecting pipe or conduit penetrates the shell and to mount large doors on the shell on opposite sides of each projecting pipe or conduit with the doors being shaped so that when they are closed they extend closely around the pipe or conduit and when they are open they leave a large opening for access to the interior of the outer shell.

The doors for nuclear reactor containment shells are quite bulky and they may weigh as much as three thousand five hundred pounds (1600 kilograms). In addition, for reasons of safety it is important that these doors be mounted very accurately on the shell so that they can be swung between opened and closed position with very little effort and so that they will remain in any position to which they are set. It has been found difficult, however, to mount heavy doors on the outer shell of a nuclear reactor with a high degree of accuracy because the outer surface of the shell is curved and is generally uneven.

The prior art shows various door mounting arrangements which use adjustable hinges. Some examples of these adjustable hinges are shown in U.S. Pat. Nos. 398,636, 679,377, 1,484,536, 2,302,484, 2,581,104, 2,583,950, 2,683,279, 2,839,778 and 2,988,414. None of these hinges however can be adjusted firstly, to compensate for the unevenness of the support structure surface when the hinge is being installed, and secondly, to compensate for the vertical misalignment or tilting of the hinge pin due to the weight of the door after the hinge has been installed. Although U.S. Pat. Nos. 679,377, 2,581,104, and 2,988, 414 show hinges which are adjustable to control tilting of the hinge axis, these adjustments are limited in scope and are not suited for the compensation of support structure unevenness during hinge installation. Also any attempt to adjust the vertical alignment of the hinge axis in the above patents results in stress on the pivot bearing for the hinge pin which is unsuitable for the heavy door mountings with which the present invention is useful.

SUMMARY OF THE INVENTION

The present invention overcomes the difficulties of the prior art and provides a novel hinge assembly which can be adjusted to compensate for support structure unevenness and for hinge axis tilting due to the weight of the door. Also, with this invention these adjustments can be carried out in a simple and reliable manner without causing undue strain on the hinge pin bearings.

According to the present invention there is provided an elongated pivot rod which is attached to the door. Upper and lower rotatable bearings are fitted to the upper and lower ends of the pivot rod. An elongated alignment bar is provided near and parallel to the pivot rod and is arranged to support the upper and lower rotatable bearings. An upper support plate extends out from the door support and this plate is rockingly interconnected to the upper end of the alignment bar; for example, the upper end of the bar may extend through a hole in the plate so the bar may swing or rock to a certain degree with respect to the plate. A lower support plate also extends out from the door support and the lower end of the alignment bar rests on and is slidingly supported by this plate. A lateral adjustment mechanism is also provided on the lower support plate to slide, and thereby shift the position of, the lower end of the alignment bar on the lower support plate.

With the arrangments of the present invention the hinge assembly can be mounted on the door so that the pivot rod is nearly perfectly vertical and yet when the support plates are brought close to the door support all necessary adjustments can be made to fit the support plates to the door support without affecting the vertical orientation of the pivot rod. Thereafter, when the hinge assembly is subjected to the full weight of the door, any misalignment which develops as a result of the imposition of this weight can be corrected easily and accurately simply by adjusting the lateral adjustment mechanism and the vertical adjusting mechanism.

According to a further feature of the invention the vertical height of the pivot rod, and therefore of the door, may be made adjustable by providing a vertical mechanism between the lower pivot rod bearing and the vertical alignment rod.

According to a still further feature of the invention the hinge pin may be connected to the door through a series of links comprising flanges and addition pivot rods and in this way the door is enabled to undergo both translational and swinging movement as it goes between its opened and closed positions. By constructing the links so that all the pivot rods are parallel to each other a single adjustable alignment rod, as previously described, will provide the same adjustability as is obtained with a single pivot hinge.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the several purposes of the invention. It is important, therefore, that this disclosure be regarded as including such equivalent arrangements as do not depart from the spirit and scope of the invention.

BRIEF DESCRIPTION OF THE DRAWINGS

Selected embodiments of the invention have been chosen for purposes of illustration and description, and are shown in the accompanying drawings, forming a part of the specification, wherein:

FIG. 1 is a fragmentary perspective view showing a portion of a nuclear reactor vessel and outer shell on which are mounted doors and hinges according to the present invention;

FIG. 2 is a section view taken along line 2—2 of FIG. 1;

FIG. 3 is a section view similar to FIG. 2 but showing the doors in opened condition;

FIG. 4 is a front elevational view of one of the door hinges of FIG. 1 but shown in fully extended condition;

FIG. 5 is a section view taken along line 5—5 of FIG. 4 when the door hinge is articulated to a closed door position;

FIG. 6 is a bottom view taken along line 6—6 of FIG. 4;

FIG. 7 is a fragmentary elevational view, partly in section, showing a lower portion of the hinge of FIG. 4 with a temporary mounting tool;

FIG. 8 is a view similar to FIG. 7 but showing the lower portion of the hinge with a temporary vertical adjusting tool;

FIG. 9 is a section view taken along line 9—9 of FIG. 8;

FIG. 10 is a perspective view of the mounting tool shown in FIG. 7;

FIG. 11 is a perspective view of the vertical adjusting tool shown in FIG. 8;

FIG. 12 is a view taken along line 12—12 of FIG. 8 and showing the bottom of the vertical adjusting tool;

FIG. 13 is a view similar to FIG. 7 but showing the lower portion of an intermediate link of the hinge with a temporary mounting tool;

FIG. 14 is an exploded perspective view, partially cut away, showing the construction of a portion the hinge of FIG. 1 and a first step in the assembly of the hinge;

FIG. 15 is a perspective view, partially cut away, showing a further portion of the hinge of FIG. 1 and a second step in its assembly;

FIG. 16 is a perspective view of the complete hinge of FIG. 1 and the final step in its assembly;

FIG. 17 is a view similar to FIG. 2 but showing an alternate form of hinge;

FIG. 18 is a front elevational view, partially in section, of the hinge of FIG. 17; and FIG. 19 is a fragmentary plan view showing an upper support plate used in the embodiment of FIGS. 17 and 18.

DETAILED DESCRIPTION OF THE PREFERRED EMBODIMENTS

In FIG. 1 there is shown in outline from a portion of a nuclear reactor vessel 20 and a surrounding outer shell 22. The outer shell 22, as shown, is spaced outwardly away from the vessel 20 and it serves as a safety barrier should any failure occur in the structural integrity of the vessel.

Typically, nuclear reactor vessels have a number of penetrations of various sizes and located at various sites about the vessel. These penetrations are provided with pipes or conduits which lead out from the interior of the vessel 20 and through the outer shell 22 to various auxiliary monitoring servicing, control and utilization equipment (not shown). By way of example FIG. 1 shows a pipe 24 which extends outwardly from the vessel 20 and through the outer shell 22.

It is necessary that the opening in the outer shell 22, through which the pipe 24 projects, be large enough to enable access to the interior of the shell in the vicinity of the pipe when the reactor is shut down for inspection or servicing. On the other hand, when the reactor is in operation the outer shell 22 should fit closely about the pipe 24 to provide maximum shielding. In order to meet these different requirements closure doors 26 are provided on the shell 22 adjacent the pipe 24. These closure doors are in the form of semi-circular hatches and when closed they are held in place on the outer shell 22 by closure bolts 28 so that they closely surround the pipe 24 in the manner of a washer or flange. Hinge assemblies 30 are also mounted on the outer shell 22 and support the closure doors 26 to allow them to swing open for access when the reactor is serviced or inspected and the closure bolts 28 are removed. The outer shell 22 thus serves as a door support either via the closure bolts 26 or via the hinge assemblies 30.

The hinge assemblies 30, as shown in FIG. 1 each comprise a pair of separately pivoted plate-like links 32 and 34. The purpose for these links is to enable the closure doors 26 to move translationally as well as rotationally as they are being opened. This enables the doors to clear obstructions located immediately in front of them, such as a flange 24a on the pipe 24. The manner in which the doors 26 can be moved with this double link arrangement so as to clear nearby obstructions can be seen in FIGS. 2 and 3.

The overall construction of the hinge assemblies 30 is shown in FIG. 4. As can be seen, a first pivot rod 36 is bolted by means of first pivot rod bolts 38 to a pair of lugs 40 formed along one edge of the closure door 26. Upper and lower bearings 42 and 44 have their inner races fitted to the upper and lower ends of the pivot rod 36. The inner race of the upper bearing 42 rests on an upper shoulder 36a of the pivot rod while a lower shoulder 36b of the pivot rod rests on the inner race of the lower bearing 44. The outer races of the bearings 42 and 44 are fitted into openings in upper and lower connecting flanges 46 and 48 which are welded to, and project out from, one edge of the first link 32.

A retention collar 50 supports the lower bearing 44 in the lower connecting flange 48. As can be seen in FIG. 4 the retention collar 50 has a sleeve portion 52 which extends up into the opening in the lower connecting flange 48 and abuts the outer race of the lower bearing 44. The retention collar 50 also has a lower flange portion 54 which extends over the bottom surface of the lower connecting flange 48. A plurality of holes extend through the flange portion 54 and alternate ones of these holes are threaded. Tension bolts 56 extend through the non-threaded holes of the flange portion 54 of the collar 50 and are threaded into threaded holes in the lower connecting flange 48. Compression bolts 58 are threaded into the threaded holes of the flange portion 54 of the collar 50 and abut against the lower surface of the lower connecting flange 48. It can be seen that by proper adjustment of the tension and compression bolts 56 and 58 the retention collar 50 can be positioned vertically with respect to the lower connecting flange 48; and, because the outer race of the lower bearing 44 rests on the sleeve portion 54 of the retention collar 50 the bearing also can be vertically positioned. Because the shoulder 36b of the first pivot rod 36 rests on the inner race of the lower bearing 44, the pivot rod, as well as the closure door, are supported at a vertical position corresponding to the vertical positioning of the retention collar 50.

The first link 32, which is formed of plate steel, is shaped, along its edge opposite the connecting flange 46 and 48, with a pair of lugs 62 similar to the lugs 40 on the closure door 26. A second pivot rod 64 is bolted by means of second rod bolts 66 to the lugs 62 of the first link 32. Upper and lower bearings 68 and 70 have their inner races fitted onto each end of the second pivot rod 64 to abut against upper and lower shoulder 64a and 64b respectively. The outer races of the bearings 68 and 70 are fitted into openings of upper and lower connecting flanges 72 and 74 welded to extend out from the second connecting link 34. A retention collar 76, identical to the collar 50, is provided at the lower connecting flange 74 for vertically adjustable support of the lower bearing 70, and consequently of the second pivot rod 64 at the first link 32.

The second link 34, like the first link 34 is formed with lugs 78 along its edge opposite from the connecting flanges 72 and 74. A third pivot rod 80 is bolted to the lugs 78 by means of third pivot rod bolts 82 and upper and lower bearings 84 and 86 have their inner races fitted to the upper and lower ends of the rod 80 to abut against upper and lower shoulders 80a and 80b of the rod.

The outer race of the upper bearing 84 is fitted into an opening in a horizontally disposed upper plate 88 and this plate in turn is welded to extend out from near the upper end of a vertical alignment bar 90. The outer race of the lower bearing 86 is fitted into an opening in a horizontally disposed lateral adjustment plate 92 and is supported in the plate 92 by a retention collar 94 identical to the collar 50 and the collar 72. The lower adjustment plate 92 is also welded to the vertical alignment bar 90 near its lower end.

The upper end of the vertical alignment bar 90 is rockably fitted into an opening 97 in a horizontally disposed upper support plate 96. The upper support plate 96 in turn is welded, as at 96a, to the surface of the outer shell 22. As can be seen in cross section in FIG. 4 the opening 97 in the plate 96 is rounded or tapered to form a circumferential fulcrum which permits a limited amount of swinging or rocking of the vertical alignment bar about any axis passing horizontally through the center of the plate opening 97.

The lower end of the vertical alignment bar 90 extends a short distance below the lateral adjustment plate 92 and it is rounded to form a slideable foot 90a. The slideable foot 90a rests on and is supported by the upper surface of a horizontally disposed lower support plate 98. This lower support plate is also welded, as at 98a, to the surface of the outer shell 22. The lower support plate 98 also extends under the third pivot rod 80 and it has an enlarged opening 100 to accommodate the retention collar 94 with a substantial amount of lateral clearance.

As can be seen in FIGS. 4, 5 and 6, plate-like side flanges 102 and 104 extend upwardly from and are welded to the side edges of the lower support plate 98. The flanges 102 and 104 also abut and are welded to the surface of the outer shell 22. In addition, as shown in FIGS. 5 and 6, a plate-like front flange 106 extends upwardly from and is welded to the front or outer edge of the lower support plate 98.

Lateral abutment screws 108 extend horizontally through threaded holes in the side flanges 102 and 104 and abut against the side edges of the lateral adjustment plate 92. Similarly, a central abutment screw 110 extends horizontally through a threaded hole in the front flange 106 and abuts against the front edge of the lower adjustment plate 92. A pair of tension screws 112 also extend through horizontally extending slots 114 in the front flange 106 on each side of the screw 110 and these tension screws are threaded into the front edge of the lateral adjustment plate 92. The slots 114 allow lateral or horizontal movement of the tension screws 112 with respect to the front flange 106 as the adjustment plate 92 moves parallel to the flange. Enlarged washers 116 are interposed between the front flange 106 and the heads of the tension screws 112 to transfer tension loads on the screws to the front flange.

By selective adjustment of the screws 108, 110 and 112, the lateral adjustment plate 92 may be shifted horizontally with respect to the lower support plate 98 and the slideable foot 90a of the vertical adjustment bar will slide over the upper surface of the lower support plate. These adjustments may be made in any horizontal direction and, in fact, the adjustment plate may be made even to rotate to a limited degree.

As the lateral adjustment plate 92 is moved in the manner described, it causes the vertical alignment bar 90 to swing or rock in the opening 97 in the fixed upper support plate 96. In this manner the vertical alignment of the bar 90 is adjusted in any desired direction. Also, because of the manner in which the various pivot rods 36, 64 and 80 are mounted, they are all maintained parallel to the vertical alignment bar 90. Thus as the alignment bar 90 is adjusted each of these pivot rods is likewise adjusted.

It will be appreciated from a consideration of FIG. 4 that when the closure bolts 28 of the doors 26 are removed so that the door 26 can be swing open, the weight of the door is transferred through the first pivot rod 36 to the lower bearing 44 and from there to the retention collar 50 and the lower connecting flange 48 of the first link 32. In a similar manner this weight is transmitted to the second link 34 and to the lateral adjustment plate 92. The weight imposed on the lateral adjustment plate is then transferred through the vertical alignment bar 90 to the lower support plate 98 and from there to the outer shell 22. The construction of the hinge assembly 30 as shown in FIG. 4 serves very well to support the door 26 and to transfer its weight to the outer shell 22. As will be explained however, the present invention makes it possible to obtain very precise hinge orientation and positioning by first mounting the hinge assembly 30 on the door 26 while it is bolted in place and thereafter welding the plates 96 and 98 and flanges 102 and 104 to the outer shell 22.

When the hinge assembly 30 is mounted on the door 26, but is not yet welded to the outer shell, the weight transfer is in a direction from the hinge assembly elements themselves to the closure door 26. As a result it might happen that the first and second links 32 and 34, as well as the vertical alignment bar 90 with the plates 88 and 92 and the support plates 96 and 98 and flanges 102 and 104, will fall while the various bearings 42, 44, 68, 70, 84 and 86 are pulled or pushed out of their respective connecting flanges.

In order to maintain the hinge assembly 30 intact while it is being mounted, a special mounting tool 120 (FIG. 10) is provided under each of the pivot rods 36, 64 and 80. As shown in FIG. 10, the mounting tool 120 comprises a circular flange plate 122 and a central hub 124. A plurality of threaded abutment screw holes 126 are provided in the flange plate 122 and a pair of unthreaded holes 128 extend through the hub 124.

As shown in FIG. 7 a mounting tool bearing 130 is fitted onto the hub 124 of the mounting tool 120 and the mounting tool is attached to the bottom of the third pivot rod 80 by means of a pair of tension bolts 132 which extend through the holes 128 and which are threaded into the lower end of the pivot rod 80. The bolts 132 are drawn up tight so that the lower end of the retention collar 94 rests on the outer race of the mounting tool bearing 130 while a shoulder 134 around the mounting tool hub 124 supports the inner race of the bearing. The tension bolts 132 thus cause the shoulder 134 and the lower shoulder of the pivot rod 80 to pull the inner races of the bearings 86 and 130 toward each other while the retention collar 94 holds the outer races of these bearings apart. This arrangement keeps the bearing 86 from being pulled or pushed out from the adjustment plate 92 and yet allows relative rotation between the plate and the pivot rod 80. In addition abutment screws 136 are threaded through the holes 126 of the flange plate 122 and press against the lower surface of the lower support plate 98 to hold it up against the slideable foot 90a of the vertical alignment bar 90. Thus the mounting tool 120 holds the various elements to the third pivot rod 80 in proper positional and pivotal arrangement while the hinge assembly 30 is being mounted. Additional mounting tools 120 are secured in similar manner to the lower ends of the first and second pivot rods 36 and 64 to hold the various elements to them in the same manner as shown in FIG. 13. It will be noted however that since no lower support plate is utilized in the region of the first and second pivot rods 36 and 64 it is not necessary to provide abutment screws in the flange plates of those mounting tools.

FIGS. 14, 15 and 16 show the sequence of mounting a door and hinge assembly according to the present invention. Reverting preliminarily to FIG. 1, it will be noted that each of the closure doors 26 is provided along its outer edge with a lifting eye 140. These lifting eyes are engaged by hooks of a lifting mechanism (not shown) such as an overhead crane which initially positions the closure door at the opening in the outer shell 22. Because of irregularities in the shell surface and because of its large size and its curvature, as well as the size of the closure door 26 itself, it is not possible to pinpoint the proper location and orientation which the closure door should have before it is lifted into position.

When the door 26 is positioned, and while it is being held by the lifting mechanism, the closure bolts 28 are installed. In this connection the holes for the bolts 28 may be drilled and tapped in the outer shell 22 while the door is being held in place by the lifting mechanism. After the closure doors 26 are bolted in place the lifting mechanism may be taken away and the hinge assemblies 30 may be installed.

As shown in FIG. 14, the vertical alignment bar 90, together with the upper connecting plate 88 and the lower adjustment plate 92, both of which are welded to the alignment bar, are positioned on the lower support plate 98. The side flanges 102 and 104 and the front flange 106 have been welded to the support plate 98 and the lateral and central abutment screws 108 and 110 are threaded in place to locate the adjustment plate 92 with respect to the lower support plate 98. The third pivot rod 80 is then inserted up through the enlarged opening in the lower support plate 98 and through a bearing opening 144 in the adjustment plate 92. The inner race of the upper bearing 84 is fitted to the upper end of the pivot rod 80 and its outer race is fitted into a bearing opening 144 in the upper connecting plate 88. The lower bearing 86 and retention collar 94 (FIG. 4) are then assembled and the mounting tool 120 (FIG. 7) is fixed in place to hold the subassembly together. The third pivot rod 80 is then bolted to the second link 34.

The second pivot rod 64 is assembled with the upper and lower connecting flanges 72 and 74 of the second link 34 in a similar manner and a second mounting tool 120 is fixed in place by bolting it to the lower end of the second pivot rod 64 as shown in FIG. 13 to hold the subassembly together. The second pivot rod 64 is then bolted to the first link 32.

The first link and the first pivot rod 36 are assembled and the first pivot rod is bolted to the lugs 40 of the closure door 26 in similar fashion, care being taken to ensure that the first pivot rod 36 is nearly perfectly vertical. In this connection it may be necessary to grind one or the other of the lugs 40 on the door 26 to be sure that when the first pivot rod 36 is bolted to it the upper and lower bearings 42 and 44 will be in precise vertical alignment. This is important because the ease with which the door can be swung and the ability of the door to stay in whatever position it has been positioned depends upon the maintenance of a proper vertical alignment of its pivot axis.

It will be appreciated that the various links and other parts of the hinge assembly 30 can be precision manufactured and preassembled in a shop and therefore the several pivot rods 36, 64 and 80 can be made to be precisely parallel to each other. Therefore it is necessary only to adjust for vertical positioning of the first pivot rod 36 at the reactor or door mounting site since the parallelism of the several pivot rods will ensure that they all will be in precise vertical alignment.

After the hinge assembly has been bolted to the closure door 26, as shown in FIG. 15, the assembly is articulated, as shown in FIG. 16 and the lower support plate 98 and the side flanges 102 and 104 are moved up against the outer shell 22. Also, the upper support plate 96 is fitted over the upper end of the vertical alignment bar 90 and the plate 96 is also brought up against the shell 22. If the inwardly facing edges of the support plates 96 and 98 and of the flanges 102 and 104 lie flat against the surface of the shell 22 they are simply welded in place to the shell. It is unlikely however that the plate and flange edges will be so precisely well fitted to the shell surface because of the large size of the shell and its general irregularity. Any misalignment between the shell and the edges of the supporting plates and flanges of the hinge assembly is readily compensated, however; and this compensation may be carried out without shifting the various pivot rods 36, 64 and 90 from the precise vertical orientation to which they had previously been set as above described. The adjustments necessary to bring the edges of the plates 96 and 98 and of the flanges 102 and 104 flat against the outer shell 22 are obtained by manipulating the lateral and central adjustment screws 108 and 110 and the tension screws 112. By selectively adjusting these screws, the lateral adjustment plate 92 can be shifted laterally or horizontally with respect to the lower support plate 98. This allows the support plates and flanges to be brought flush precisely against the outer shell so that their edges can be solidly welded to the shell.

It will be noted that side to side positioning of the adjustment plate 92 can be obtained using only the abutment screws 108 since these screws are arranged in the opposite side flanges 102 and 104 and they work against each other on opposite edges of the plate 92. Forward and rearward positioning of the plate 92 cannot be obtained in this manner, however, because no flange plate with adjustment screws can be provided along the inner edge of the support plate 96 since this edge of the plate is to be welded to the shell 22. Accordingly, the tension screws 112 are provided to move the plate 92 forwardly while the central abutment screw 110 is used to move the plate rearwardly. The slots 114 in the front flange 106 permit the tension screws 112 to move from side to side with the plate 92 when it is being adjusted by the lateral abutment screws 108.

After the plates 96 and 98 and the flanges 102 and 104 have been welded to the outer shell 22, the mounting tools 120 can be removed. The closure bolts 28 (FIG. 1) are then removed and the doors 26 are swung upon and tested to be sure that they can be moved with a minimum of effort and that they stay in a fixed position without swinging. It is quite possible that in spite of the fact that the pivot rods 36, 64 and 80 had been positioned in precise vertical alignment, a certain degree of misalignment may occur due to the weight of the door which is transferred to the hinge assembly 30 when the door is unbolted. This misalignment may result from stresses applied to the various bearings and slight movements of the bearings in their respective settings. The misalignment which results from the transfer of the door weight to the hinge assembly is easily compensated simply by making further adjustments to the lateral and central abutment screws 108 and 110 and the tension screws 112. In view of the fact that the support plates 96 and 98 and the flanges 102 and 104 are now solidly welded to the outer shell 22, the adjustments of the abutment and tension screws serve to swing the vertical alignment bar 90, as well as the pivot rods 80, 64 and 36, in any desired direction so that they can be realigned to substantially vertical orientation.

The transfer of the door weight to the hinge assembly will also result in a finite amount of sagging due to strain in the various components of the hinge assembly. As a result when the door 26 is reclosed the various bolt holes in the door and the shell may not come back into alignment so as to permit reinsertion of the closure bolts 28. This sagging and consequent misalignment can be compensated easily with the arrangements of the present invention and more specifically with the use of a simple vertical adjustment tool 150 as shown in FIGS. 8, 9, 11 and 12.

As can be seen in FIG. 11, the vertical adjustment tool 150 comprises an oblong block of metal with a pair of unthreaded holes 152 at its ends and a threaded hole 154 extending through its central region. As can be seen in FIG. 12, the tool 150 is short enough to fit inside the enlarged opening 100 in the lower support plate 98 but is long enough to extend over the flange portion of the retention collar 94 with the unthreaded holes aligned with two diametrically opposed holes in the collar. As can be seen in FIGS. 8 and 9 tension screws 156 extend up through the unthreaded holes 152 in the adjustment tool 150 and through corresponding unthreaded holes 158 in the retention collar 94. The tension screws 156 are then threaded into the lower surface of the adjustment plate 92. Thus, the adjustment tool 150 is suspended from the adjustment plate 92 by the tension screws 156; and the retention collar 94 is free to move up and down along the tension screws 156.

A vertical adjustment screw 160 is threaded into the central hole 154 of the adjustment tool 150 as shown in FIGS. 8 and 9. The end of the adjustment screw 160 abuts the lower end of the third pivot rod 80 and moves it up or down with respect to the lower adjustment plate 92. This in turn causes the links 34 and 32 to be moved up and down as well, along with the closure door 26. The door 26 is then swung to a closed position and the adjustment screw 160 is turned to adjust the vertical position of the door so that the closure bolts 28 may be reinserted through their respective openings in the door and shell to lock the door in position.

When the necessary vertical adjustments have been made, as above described, the tension and compression bolts 56 and 58 are adjusted to bring the retention collar 94 up against the lower bearing 86 with the bearing 86 up against the lower shoulder of the pivot rod 80. The adjustment screw 160 is then backed off and the weight of the closure door 26 will automatically be transferred to the retention collar and from there to the adjustment plate 92 the lower end of the vertical alignment bar 90 and the lower support plate 98 without further sagging of the door. The tension screws 156 are then removed along with the vertical adjustment tool 150. If further vertical adjustments should become necessary at a later time the vertical adjustment tool may, of course, be reapplied and used in the same manner to make such readjustments.

In some situations, as where no obstructions are present in the vicinity of the closure doors, it is not necessary to provide for both translational and rotational motion and instead the door may be arranged to swing open about a single pivot and the intermediate pivoted links may be eliminated. FIGS. 17, 18 and 19 show a door hinge arrangement according to the present invention and using a single pivot.

The single pivot hinge arrangement of FIGS. 17, 18 and 19 is similar to the three pivot arrangement of FIG. 4 except that the first and second links 32 and 34 have been eliminated along with their respective first and second pivot rods 36 and 64. The remaining third pivot rod 80 is bolted directly to the lugs 40 of the closure door 26.

The remaining portion of single pivot hinge embodiment of FIGS. 17, 18 and 19 is identical to the corresponding portion of the multiple pivot embodiment of FIG. 4 with the exception that in this single pivot embodiment there is provided a horizontal plate 162 which lies against and extends under the lower support plate 92. As can be seen in FIG. 17 the lower support plate 98 does not lie flat against the surface of the outer shell 22 but instead it contacts the outer shell only at one corner 98b. This occurs because the single pivot connection does not allow the plate 98 to be moved except rotationally about a fixed pivot when the closure door 26 is bolted to the shell. Although the adjustment screws 108, 110 and 112 can provide a certain degree of additional movement their range of adjustment may not be expected to be sufficient to bring the inner edge of the plate 98 flush against the shell 22.

In installing the hinge assembly of FIGS. 17, 18 and 19 the closure door 26 is first mounted on and bolted to the shell 22 as in the preceding embodiment. Thereafter the hinge assembly is installed, with the third pivot rod being bolted to the closure door lugs 40. The lower support plate 98 is swung around until its corner 98b, as well as the inner vertical edge of the side flange 102, contacts the shell 22. The corner of the plate 98 and the edge of the flange 102 are then welded to the shell 22. Thereafter the horizontal plate 162 is positioned under the lower support plate 98 and is slid along until it contacts the shell surface as shown in FIG. 17. The horizontal plate is then welded both to the shell 22 and to the lower support plate 98.

When the lower portion of the hinge assembly has thus been welded to the outer shell 22 an upper support plate 164, similar to the upper support plate 96 of the preceeding embodiment, is fitted onto the upper end of the vertical alignment bar 90 and is also welded to the outer shell 22. The upper support plate 164, as shown in FIG. 19 is of rectangular configuration and is provided with an opening 166 which fits over the upper end of the vertical alignment bar to provide a circumferential fulcrum as in the preceding embodiment. The opening 166 however is not centrally located on the plate. Instead, the opening is positioned such that it is a different distance from each of the four edges of the plate, as indicated by the dimensions A, B, C and D.

When the plate 164 is assembled to the hinge the plate is rotated until the dimension A, B, C or D corresponding most closely to the distance from the vertical alignment bar to the shell is positioned between the bar and the shell. The plate is then welded in place on the shell. It will be appreciated that the plate is, in effect, self-adjusting to the distance between the bar and the shell.

After the plate 164 has been welded in place the mounting tool is removed and the door 26 is unbolted and opened. The various adjustments necessary to compensate for sagging and swinging are then carried out as in the preceeding embodiment.

It will be appreciated that the hinge assemblies of the present invention are very versatile in that they can be made to accommodate doors of various sizes and weight and they can accommodate various mounting conditions such as might be encountered due to irregular and curved surface of a nuclear reactor shell.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

I claim:

1. A hinge assembly for supporting a door on a door support, said hinge assembly comprising an elongated pivot rod attached to said door, upper and lower rotatable bearings connected to said pivot rod near its upper and lower ends, an elongated alignment bar extending close to and substantially parallel with said pivot rod and arranged to mount said upper and lower bearings, an upper support plate supported by and extending out from said door support, a rocking pivot interconnecting said upper support plate and said alignment bar, a horizontally extending lower support plate extending out from said door support, the lower end of said alignment bar resting slideably on and supported by said lower support plate and a lateral adjustment mechanism mounted on said lower support plate and adjustable to shift the lower end of said alignment bar horizontally on said lower support plate.

2. A hinge assembly according to claim 1 wherein said lateral adjustment mechanism comprises flanges extending upwardly from the edges of said lower support plate and adjustment screws extending through said flanges and acting on a member connected to said alignment bar.

3. A hinge assembly according to claim 2 wherein said member connected to the alignment bar is an adjustment plate extending from the bar parallel and close to the lower support plate.

4. A hinge assembly according to claim 3 wherein some of said adjustment screws are threaded into said flanges and abut against the edges of said adjustment plate.

5. A hinge assembly according to claim 3 wherein said lower bearing is contained in said adjustment plate.

6. A hinge assembly according to claim 4 wherein at least some of said screws extend through slots in at least one of said flanges and are threaded into said adjustment plate.

7. A hinge assembly according to claim 1 wherein the upper end of said vertical alignment member is round and fits into an opening in said upper support plate, said opening providing a close fit with said upper end of said vertical alignment member but sized and configured to allow rocking movement therein of said vertical alignment member.

8. A hinge assembly according to claim 1 wherein said pivot rod is adjustable vertically with respect to said alignment bar.

9. A hinge assembly according to claim 8 wherein said upper and lower bearings are fitted into openings in upper and lower plates extending out from said alignment bar and are moveable up and down in said openings.

10. A hinge assembly according to claim 9 wherein a retention collar is mounted on said lower plate for vertical adjustment therewith, said retention collar having a sleeve which fits into the plate opening to support the lower bearing.

11. A hinge assembly according to claim 10 wherein said retention collar is connected to said lower plate by screws.

12. A hinge assembly according to claim 1 wherein said alignment bar is arranged to mount said upper and lower bearings by means of a plurality of pivotally interconnected connecting links.

13. A hinge assembly according to claim 12 wherein each connecting link comprises a plate having a pivot rod attached along one edge with upper and lower rotatable bearings at the ends of the pivot rod and upper and lower connecting flanges extending out from the opposite edge of said plate to accommodate upper and lower rotatable bearings at the ends of another pivot rod.

14. A hinge assembly according to claim 13 wherein each said pivot rod is adjustable vertically with respect to its associated lower connecting flange.

15. A hinge assembly according to claim 14 wherein the upper and lower rotatable bearings of each connecting rod are fitted into openings in said connecting flanges and are moveable up and down in said openings.

16. A hinge assembly according to claim 15 wherein a retention collar is mounted on each of said lower connecting flanges for vertical adjustment therewith, each said retention collar having a sleeve which fits into the plate to support the associated rotatable bearing.

17. A hinge assembly according to claim 16 wherein each retention collar is connected to its associated lower flange by means of adjustment screws.

18. A hinge assembly according to claim 11 or 17 wherein a mounting tool is removeably secured to said pivot rod to hold said pivot rod and said bearings in said upper and lower plates, said mounting tool comprising a further rotatable bearing having an inner race and an outer race, a shoulder contacting the lower edge of the inner race, a central hub and removeable tension bolts extending through said hub and into the lower end of said pivot rod and the outer race of said further rotatable bearing pressing up against the lower edge of said sleeve.

19. A hinge assembly according to claim 18 wherein said mounting tool further includes a flange extending parallel to and below said lower support plate and abutment screws threaded through said flange plate and abutting said support plate.

20. A hinge assembly according to claim 11 or 17 wherein a vertical adjustment tool is removeably connected to said lower adjustment plate to extend across said opening and an adjustment screw threaded to and extending up through said adjustment tool into abutting contact with the lower end of said pivot rod.

21. A hinge assembly according to claim 7 wherein said upper support plate opening is a different distance from each of different edges of said plate whereby by rotating the plate on the vertical alignment member the plate may be effectively adjusted to the spacing between the uper end of the alignment member and the door support.

22. A method of hingeably mounting a door onto a door support, said method comprising the steps of bolting the door to said door support in closed position, mounting a pivot rod to one edge of the door with the axis of said pivot rod extending vertically, connecting a hinge assembly to said pivot rod, said hinge assembly comprising an alignment bar, upper and lower bearing supports extending out from said alignment bar and having rotatable bearings therein which fit onto the ends of said pivot rod, a lower support plate held to the bottom of said alignment bar and a lateral adjustment mechanism for shifting the lower end of said alignment bar with respect to said lower support plate, swinging said hinge assembly about the pivot rod axis until said support plate contacts said door support, attaching said lower support plate to said door support, assembling an upper support plate with said alignment bar by inserting the upper end of the bar through an opening in the upper support plate so that the bar is rockable in said opening, attaching said upper support plate to said door support, unbolting said door from said door support and adjusting said lateral admustment mechanism to reposition said door on said door support for rebolting when the door is closed.

23. A method according to claim 22 wherein vertical adjustment means for adjusting the vertical position of said pivot rod with respect to said lower bearing support is mounted on said hinge assembly and wherein said vertical adjustment means is adjusted in conjunction with adjustment of said lateral adjustment means after said door is unbolted.

24. A method according to claim 22 wherein, when said hinge assembly is connected to said pivot rod a mounting tool is bolted to the lower end of said rod to press upwardly on said hinge assembly to hold said hinge assembly together and wherein said mounting tool is removed after said support plates are attached to said door support.

* * * * *